(12) United States Patent
Phogat et al.

(10) Patent No.: US 10,748,316 B2
(45) Date of Patent: Aug. 18, 2020

(54) IDENTIFICATION AND MODIFICATION OF SIMILAR OBJECTS IN VECTOR IMAGES

(71) Applicant: Adobe Inc., San Jose, CA (US)

(72) Inventors: Ankit Phogat, Delhi (IN); Vineet Batra, Delhi (IN); Mridul Kavidayal, Noida (IN); Matthew Fisher, Palo Alto, CA (US)

(73) Assignee: ADOBE INC., San Jose, CA (US)

( * ) Notice: Subject to any disclaimer, the term of this patent is extended or adjusted under 35 U.S.C. 154(b) by 35 days.

(21) Appl. No.: 16/159,181

(22) Filed: Oct. 12, 2018

(65) Prior Publication Data

US 2020/0118313 A1 Apr. 16, 2020

(51) Int. Cl.
*G06T 11/60* (2006.01)
*G06F 3/0484* (2013.01)
*G06F 17/16* (2006.01)

(52) U.S. Cl.
CPC .......... *G06T 11/60* (2013.01); *G06F 3/04842* (2013.01); *G06F 3/04845* (2013.01); *G06F 17/16* (2013.01)

(58) Field of Classification Search
CPC ...................................................... G06T 11/60
USPC ........................................................ 345/619
See application file for complete search history.

(56) References Cited

U.S. PATENT DOCUMENTS

| | | | | |
|---|---|---|---|---|
| 7,012,624 B2* | 3/2006 | Zhu | ......................... | G06T 5/005 345/582 |
| 8,594,460 B2* | 11/2013 | Lindskog | ................. | G06T 11/00 345/619 |
| 8,861,868 B2* | 10/2014 | Shechtman | ............. | G06T 11/60 382/218 |
| 2003/0190090 A1* | 10/2003 | Beeman | ................... | G06T 11/60 382/284 |
| 2005/0216841 A1* | 9/2005 | Acker | .................. | G06F 3/04845 715/730 |
| 2007/0265813 A1* | 11/2007 | Unal | ...................... | G06T 7/0012 703/2 |
| 2008/0225057 A1* | 9/2008 | Hertzfeld | ............. | G06F 3/04845 345/619 |
| 2010/0158375 A1* | 6/2010 | Okamoto | ........... | G06K 9/00463 382/173 |
| 2019/0354744 A1* | 11/2019 | Chaloux | ................. | G06F 16/58 |

OTHER PUBLICATIONS

"PixelTone: a multimodal interface for image editing" CHI '13: Proceedings of the SIGCHI Conference on Human Factors in Computing Systems•Apr. 2013, pp. 2185.*

* cited by examiner

*Primary Examiner* — Javid A Amini

(57) ABSTRACT

A selection of a key path of a vector image displayed using a graphical user interface (GUI) may be received, via the GUI. At least one candidate path of the vector image is identified. A pairwise comparison of the key path with the at least one candidate path is executed, the pairwise comparison including characterization of a translation, scaling, and rotation of the at least one candidate path with respect to the key path. Based on the pairwise comparison, it is determined that the at least one candidate path is within a similarity threshold defined with respect to the key path. A visual indicator of the at least one candidate path within the GUI, identifying the at least one candidate path as being within the similarity threshold, may be provided.

20 Claims, 7 Drawing Sheets

IDENTIFICATION AND MODIFICATION OF SIMILAR OBJECTS IN VECTOR IMAGES

TECHNICAL FIELD

This description relates to digital image editing.

BACKGROUND

Digital image editing refers generally to the use of computer software and associated hardware to access a digital image file and perform modifications on the image of the digital image file. In many cases, such modifications may require numerous manual and automated operations, particularly when the image(s) being modified contain a potentially large number of image objects.

Vector images are a type of digital image in which the images, and included image objects, are constructed in terms of geometric shapes. For example, a vector image may include a circle that is defined in terms of its radius. Complex images may be constructed using combinations of various shapes/formulas. Vector images may also be referred to as, or include, vector graphics.

For example, a vector image may include a large number of image objects, such as persons, animals, plants, or structures. For example, a vector image of a field may include a large number of image objects, such as flowers or trees. In many such cases, a user wishing to edit such a vector image may find that a large number of image objects of a particular type (e.g., flower) may be included within the vector image. In other cases, a user may use existing digital image editing tools (e.g., copy/paste functionality) to create duplicates, or near duplicates, of one or more such image objects.

Thus, in various situations, a given vector image may include image objects that are the same as, or very similar to, one another. If a large number of, e.g., flowers, is included in a vector image, the various flowers may be of different sizes, colors, or orientations, or may be placed essentially randomly within the vector image.

Consequently, it may be difficult to identify and locate all image objects of a certain type and a certain level of similarity within a vector image. In fact, even when a vector image includes a relatively small number of similar image objects, it may be a difficult task, whether manual or automated, to locate (and edit) each and every image object of a set of similar image objects.

Nonetheless, many users may wish exactly to perform a particular edit to some or all similar/same image objects within a vector image. For example, a user may wish to change a color, size, or shape of all flowers within a vector image of a field, or all clouds within a vector image of a sky. As just referenced, a user may find it difficult and time-consuming to visually identify each such image object, and, in any case, may find it difficult even to find all such image objects. Further, attempting to automate this task of identifying similar/same vector image objects may require significant computing resources and associated time periods for completing the required processing. Even then, the results of such processing may include either or both of false positives (image objects that are identified as being sufficiently similar, but are not) and false negatives (image objects that are identified as not being sufficiently similar, but are).

SUMMARY

According to one general aspect, a selection of a key path of a vector image displayed using a graphical user interface (GUI) is received, via the GUI. At least one candidate path of the vector image is identified. A pairwise comparison of the key path with the at least one candidate path is executed, the pairwise comparison including characterization of a translation, scaling, and rotation of the at least one candidate path with respect to the key path. Based on the pairwise comparison, it is determined that the at least one candidate path is within a similarity threshold defined with respect to the key path. A visual indicator of the at least one candidate path within the GUI, identifying the at least one candidate path as being within the similarity threshold, may be provided.

The details of one or more implementations are set forth in the accompanying drawings and the description below. Other features will be apparent from the description and drawings, and from the claims.

DETAILED DESCRIPTION

Figure 1:
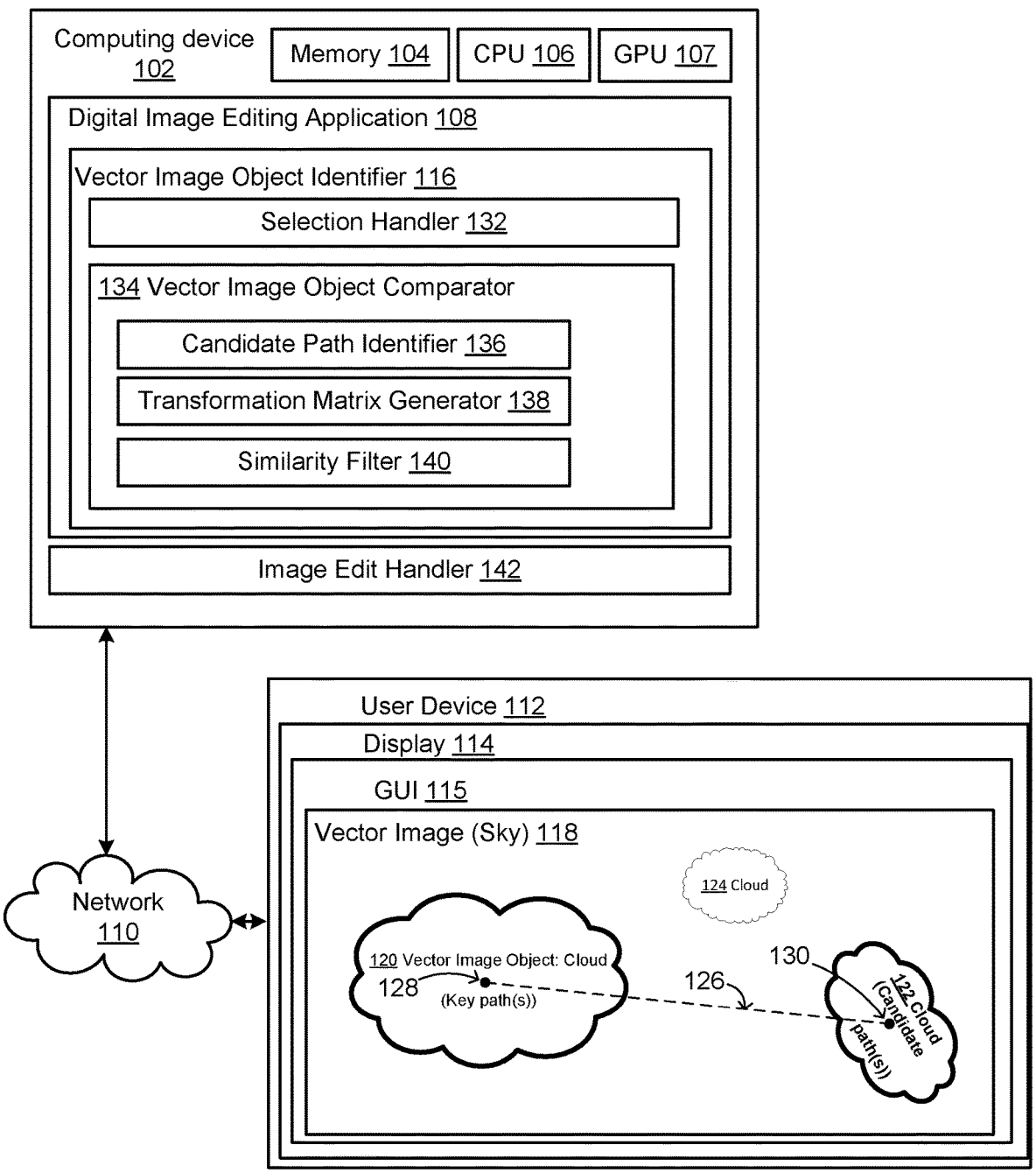
FIG. 1 is a block diagram of a system for digital image editing for identification and modification of similar objects in vector images.

This document describes systems and techniques that provide for identification and modification of similar image objects within vector images. Such systems and techniques overcome technical challenges of previous systems and techniques, and improve the process(es) to perform related automated processing. For example, from within a digital image editing software application, an image object of a vector image may be selected, and then all image objects within the vector image that are the same as, or sufficiently similar to, the image object, will be automatically identified. If desired by a user, all of the identified, similar image objects may be edited together, e.g., using a single edit that is applied to all of the similar image objects.

The described digital image editing techniques utilize an efficient, fast, accurate, complete, and widely-applicable algorithm(s) for identifying and modifying similar image objects within a vector image. For example, the described systems and techniques enable and utilize parallel processing techniques, e.g., in the context of a Graphics Processing Unit (GPU), to execute identification of similar vector objects within a vector image in a fast and efficient manner. Moreover, the digital image editing techniques provide for the new computer functionality of, e.g., automatically identifying and modifying similar image objects of a vector image, while requiring minimal technical expertise on a part of a user of the digital image editing software application.

The systems and techniques provide a user interface within the application to enable users to designate an image object within a vector image for identification and modification of similar image objects within the vector image.

Within the user interface, the user may work with a vector image to visually identify a particular image object as including one or more 'key paths', which may then be compared with all available candidate paths within the vector image. In particular, the key path(s) may be compared in parallel with all of the available candidate paths, and the subset of candidate paths that are sufficiently similar to the key path(s) may be identified as defining similar image objects. The use of parallel processing enables fast, accurate, and complete consideration of all of the potential candidate paths, so that the user may easily proceed with desired edits, while avoiding both false positive and false negative results.

Moreover, the described techniques provide a mathematical relationship between a key (e.g., selected) path, and each candidate path that is selected as being the same as, or similar to, the key path. For example, the mathematical relationship may be expressed as a transformation matrix, which provides a translation (distance/location), scale factor, and rotation angle between the key path and each candidate path. As referenced above, such a transformation matrix may be calculated in parallel for each of the candidate paths that are the same as, or similar to, the key path. Then, the various transformation matrices may be used to implement the simultaneous editing of all of the paths.

In this way, or using additional or alternative techniques, it is possible to create and edit vector images, including identifying and modifying similar image objects therein. Such editing may be performed quickly and easily, and at large scales (e.g., a detailed complex image may be edited, and/or many images may be edited together).

Additionally, the systems and techniques described herein advantageously improve existing technology areas. For example, as described, computer-based digital image editing is improved. Further, the systems and techniques may be used for a more automated and more efficient and faster approach to generating desired digital images.

FIG. 1 is a block diagram of a system for digital image editing for identification and modification of similar objects in vector images. The system 100 includes a computing device 102 having at least one memory 104, at least one CPU (central processing unit) 106, and at least one graphics processing unit (GPU) 107. The system 100 also includes at least one digital image editing application 108.

The computing device 102 may communicate with one or more other computing devices over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The GPU 107, as referenced above and described in detail, below, may be used for providing parallel processing of digital image data during the operations of the system 100. Both the CPU 106 and the GPU 107 may themselves include various types and amounts of memories (e.g., buffers, caches) used to store instructions or data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device (e.g., user device 112) over a network, such as the network 110. In one implementation, the application 108 may be a digital image editing application, or another type of application that accesses digital image editing functionality. In other implementations, the application 108 may be a stand-alone application that is designed to work with a digital image editing application (e.g., running on the user device 112). In still other alternatives, the application 108 may be an application that runs, at least partially, in another application, such as a browser application. Of course, the application 108 may be a combination of any of the above examples, as well.

In the example of FIG. 1, the user device 112 is illustrated as including a display 114. The display 114 may be used to provide a graphical user interface (GUI) 115 of the application 108, and/or a browser application used to access the application 108, as just referenced.

In the example of FIG. 1, the application 108 includes, or has access to, a vector image object identifier 116. As described herein, the vector image object identifier 116 is configured to receive, with respect to a vector image 118, a selection of a vector image object 120. Then, the vector image object identifier 116 is configured to analyze all remaining vector image objects 122, 124 in the vector image 118, to identify that the vector image object 122 is sufficiently similar to the selected vector image object 120, while the vector image object 124 is not.

The vector image 118 of FIG. 1 represents a highly-simplified example of a vector image, in which the vector image 118 is an image of the sky, while the various vector image objects 120, 122, 124 are vector image objects representing clouds in the sky. Of course, in actual images, the sky image 118 could include a large number of clouds, as well as various other image objects, such as birds, trees, or the sun.

In the following, a "vector image," as referenced above, refers to a digital image file in which a digital image is constructed using, or defined in terms of, geometric shapes or formulas. Complex images may be constructed using combinations of various shapes/formulas. Vector images may also be referred to as, or include, vector graphics.

A "vector image object" simply refers to any collection of vectors (e.g., curves, or shapes) within a vector image, and may thus be understood to represent a vector image that is a subset or portion of a larger vector image. In many cases, as in the simplified example of FIG. 1, a vector image object may represent a physical object, such as a cloud. However, as will be appreciated from the below description, it is not necessary for operations of the vector image object identifier 116 for vector image objects to represent any particular type of item or object. In fact, the described techniques compute mappings between pairs of point clouds (e.g., ordered sequences of points forming any type of curves, paths, or shapes), and can therefore determine and characterize similarities between any simple or compound objects, including groups, text, or random collections.

In general, vector images are scalable to a desired size. For example, a vector image can be scaled by mathematically increasing each of the included geometric shapes proportionally, and then rendering the result. Vector images can also be rotated, reflected, colorized, and otherwise edited or modified in a desired manner.

Consequently, and considering that vector image objects may easily be copied, duplicated, or created within one or more vector images, it will be appreciated that a given vector image may contain hundreds or thousands of a specific type of vector image object, each of which may have different visual characteristics. The various vector image objects may have been copied and pasted from a single vector image object, or created separately from a palette or template, or created independently using any available drawing tool. Therefore, the various vector image objects may be exact duplicates, or may vary in terms of one or more of, e.g., size or orientation, or may have slightly varying shapes. Further, it may occur that some part of a given vector image object may be partially obscured by some other vector image object within the larger vector image.

Some of the above variations are illustrated in FIG. 1, for the sake of example and explanation. In particular, as shown, the cloud 120 is separated from the cloud 122 by a translation distance represented by dotted line 126. More particularly, the dotted line 126 illustrates a distance between a center of mass, or centroid, of the cloud 120, shown as point 128, and the centroid of the cloud 122, shown as point 130. As may also be observed from the simplified example of FIG. 1, the cloud 122 has the same shape as the cloud 120, but is oriented at an angle of rotation relative to the cloud 120. On the other hand, the cloud 124 has a different shape than the clouds 120, 122.

In operation, the vector image object identifier 116 includes a selection handler 132 configured to receive a selection of a vector image object from within a vector image. One or more of a plurality of selection techniques may be used. For example, the selection handler 132 may provide a user of the display 114 with a selection box to be placed around the cloud 120 by the user. In other example, the user may be provided with an ability to use a cursor or other selection tool to point and click on individual curves or portions of a vector image object, in order to identify the desired vector image object in its entirety. In some cases, e.g., where vector image objects have been selected from a palette or template, a user may simply use a cursor to click anywhere within a given object, in order to select that object.

Typically, the selection handler 132 may also visually highlight the selected vector image object 120. In this way, the user may determine if an error has occurred in identifying and selecting the desired vector image object, and may modify the selection accordingly.

Once a vector image object is selected, a vector image object comparator 134 may be configured to identify all similar vector image objects within the source vector image 118. In fact, the vector image object comparator 134 may be configured to identify similar vector image objects within two or more vector images, as well.

Moreover, as referenced above and described in more detail, below, the vector image object comparator 134 is configured to identify and specify a relationship between each pair of similar vector image objects, as well as a degree or extent to which each pair is similar to one another. For example, such a relationship may specify that a similar vector image object is half the size of, and rotated by 45 degrees with respect to, an identified, selected vector image object. By specifying the relationship between pairs of vector image objects, it is possible to propagate edits from the selected vector image object to all of the identified, similar vector image objects.

In more detail, the vector image object comparator 134 includes a candidate path identifier 136. The candidate path identifier 136 is configured to identify all possible or potential candidate paths within the vector image 118 that might correspond to the selected vector image object 120.

In this regard, the term "path" refers to, or includes, any smooth or continuous outline rendered using the display 114. A path is generally independent of the resolution of the display 114, and is therefore scalable as described herein. The term path may include a straight line, a curve, a shape, or various combinations thereof. Specific examples of paths constructed using Bezier curves are provided in detail, below.

Therefore, in the following, a given vector image object, such as the cloud 120, may also be referred to as a path. In particular, when the cloud 120 is selected, using the selection handler 132, as the vector image object for which similar vector image objects are desired, the cloud 120 may be referred to as a key path.

The candidate path identifier 136 may identify all candidate paths corresponding to the key path of the cloud 120 using one or more identification techniques. For example, when the vector image 118 is constructed using shapes from a palette or template(s), the candidate path selector 136 may identify all candidate paths corresponding to available shapes. In other examples, the candidate path selector 136 may simply identify all paths within the vector image 118.

A transformation matrix generator 138 may then calculate a transformation matrix "T" describing a pairwise relationship between the key path and each of the identified candidate paths. That is, such a transformation matrix is constructed between the key path and the first candidate path, between the key path and the second candidate path, and so on for each of the identified candidate paths.

Detailed examples of such a transformation matrix T are provided, below. In general, the transformation matrix specifies at least the three transformation factors of translation, scale, and rotation.

Translation, as referenced above, refers to the distance or difference in location/position within the vector image 118. Translation may be calculated using the centroids of the key path and each corresponding candidate path, such as the translation 126 between the centroids 128, 130 in FIG. 1. For example, the vector image 118 may be represented using x,y coordinates, and the translation may be expressed using the difference between the respective x,y coordinates of the pair of centroids 128, 130.

The transformation matrix generator 138 may also generate a scale factor between the key path (cloud) 120 and each candidate path 122, 124. The scale factor represents a percentage amount that the key path is larger or smaller than a corresponding candidate path. Example techniques for calculating the scale factor are provided below, e.g., with respect to FIG. 3.

The transformation matrix generator 138 may also generate a degree of rotation between the key path (cloud) 120 and each corresponding candidate path 122, 124. For example, the rotation factor may be specified with respect to any suitable, common frame of reference define with respect to the vector image 118. Thus, for example, the key path (cloud) 120 may be defined as being at 0 degrees with respect to the selected frame of reference, while the candidate path 122 may be determined to have a rotation factor of 45 degrees.

As also described below, the translation, scale, and rotation factors may each be calculated and expressed in matrix form, or in a manner compatible with matrix expression thereof. Then, the transformation matrix T may be expressed as a concatenation of the translation/scale/rotation matrices.

Once a translation matrix is calculated for each pair of key path and candidate path(s), a similarity filter 140 may be configured to select a subset of candidate paths (and corresponding transformation matrices) that are similar to the key path. In this regard, if the key path is referenced using the notation P, and candidate paths are referenced using the notation Q, then it will be appreciated from the above description that it is possible to express the relationship between the key path P and a corresponding candidate path Q in the form $PT_1=Q_1$. In other words, applying a particular transformation matrix $T_1$ to the key path P yields the corresponding candidate path $Q_1$. Similarly, for the key path and a second transformation matrix $T_2$ and candidate path $Q_2$, $PT_2=Q_2$.

Consequently, a level of similarity between a key path/candidate path pair such as $P/Q_1$ may conceptually be represented as the difference $(PT_1-Q_1)$. In other words, for example, a candidate path created by a copy/paste operation using the key path may ideally have a difference of $PT_1-Q_1=0$. More generally, it may occur that the difference $PT_1-Q_1$ is some non-zero value, expressing a corresponding (degree of) difference between P and $Q_1$.

Therefore, the similarity filter 140 may be configured to compare the difference PT−Q (or absolute value thereof) for each key path/candidate path pair, and filter or remove all such differences that are greater than some predefined threshold. In this way, the remaining transformation matrices and associated candidate paths may be determined to be sufficiently similar to the key path.

Finally in FIG. 1, an image edit handler 142 may be configured to receive a desired edit to the key path, e.g., the cloud 120. Then, using the filtered set of transformation matrices received from the similarity filter 140, the image edit handler 142 may proceed to propagate the specified edits to all of the identified, similar candidate paths. It will be appreciated that such edits may include, e.g., a change of color, a change of size, a change of rotation/orientation, an addition or subtraction of an element, or any other edit that can be made to a vector image object. Specific examples of such image edits are provided below, e.g., with respect to FIGS. 4-12.

Figure 2:
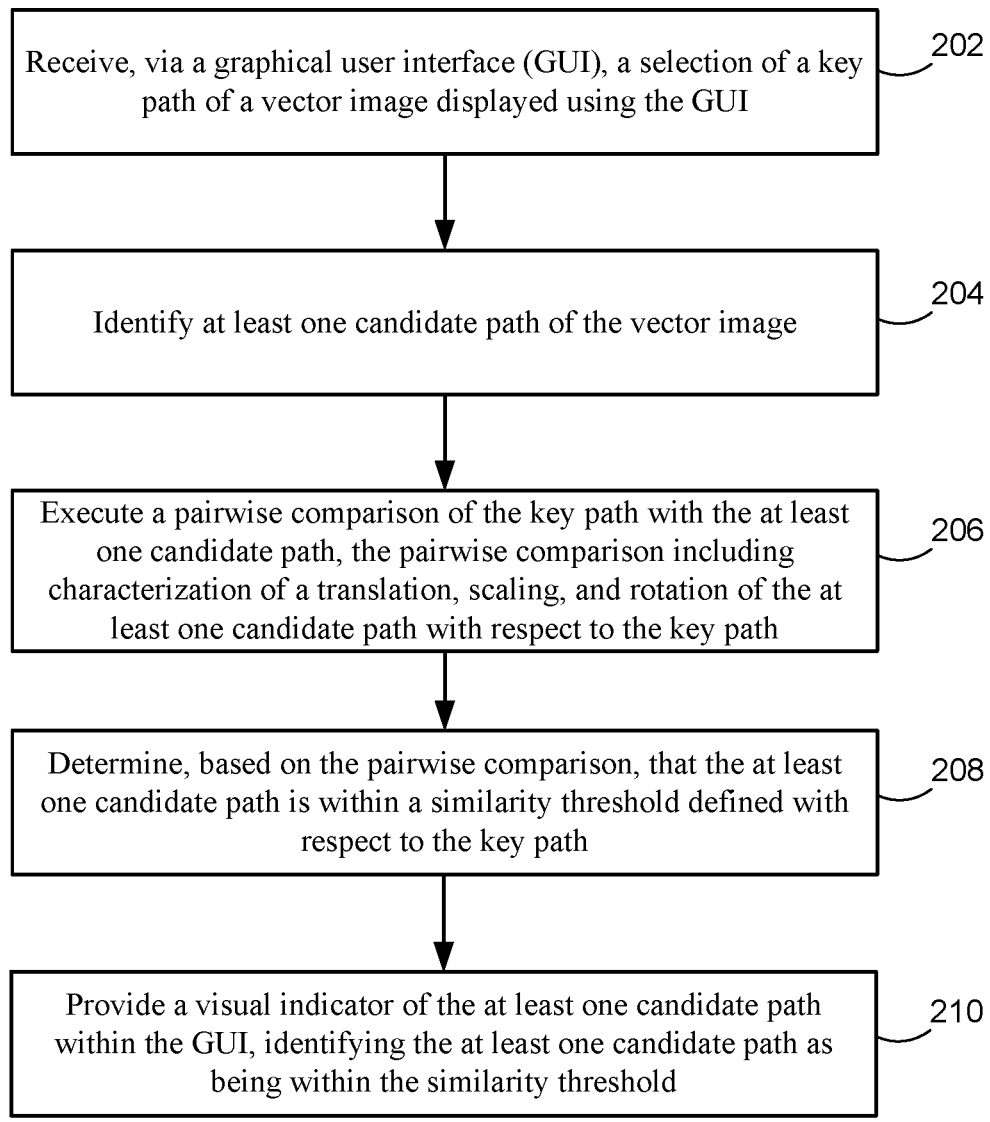
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 2, a selection may be received, via a graphical user interface (GUI), of a key path of a vector image displayed using the GUI (202). For example, the selection handler 132 may be configured to receive a selection of the cloud 120 of FIG. 1 as the key path, using selection functionality of the GUI 115. Examples of the selection functionality of the GUI 115 are provided below, e.g., in conjunction with FIGS. 5 and 8.

At least one candidate path of the vector image may be identified (204). For example, the candidate path selector 136 may be configured to select all remaining paths of the vector image in question. In the simplified example of FIG. 1, the remaining candidate paths are clouds 122, 124. In actual vector image artwork, however, there may be thousands of candidate paths. With the ability to select and consider all available candidate paths, the system 100 of FIG. 1 provides an inclusive solution, that is unlikely to miss potential matches with the selected key path.

A pairwise comparison of the key path with the at least one candidate path may be executed, the pairwise comparison including characterization of a translation, scaling, and rotation of the at least one candidate path with respect to the key path (206). For example, the transformation matrix generator 138 may be configured to calculate transformation relationships between the key path and each of the candidate paths, where the transformation relationships may be embodied in one or more transformation matrices T. As just referenced, the system 100 thus provides a quantified transformation between the key path P and each candidate path Q, where the quantified transformation includes the translation, scaling, and rotation between the key path P and the corresponding candidate path.

Based on the pairwise comparison, it may be determined that the at least one candidate path is within a similarity threshold defined with respect to the key path (208). For example, the similarity filter 140 may be configured to calculate a degree of similarity between each pair of key path and candidate path. Then, the similarity filter 140 may retain only those candidate paths with corresponding degrees of similarity that are within a pre-defined threshold. For example, the degree of similarity may be expressed as (PT−Q), as described herein, so that the threshold may be configured as a numerical value within a range of numerical values of (PT−Q) for each key path/candidate path pair.

A visual indicator of the at least one candidate path within the GUI may be provided, identifying the at least one candidate path as being within the similarity threshold (210). For example, the similarity filter 140 may be configured to highlight, bold, focus, or otherwise visually indicate each candidate path identified as being within the similarity threshold. Examples of such visual indicators are provided below, e.g., with respect to FIGS. 6 and 8.

Figure 3:
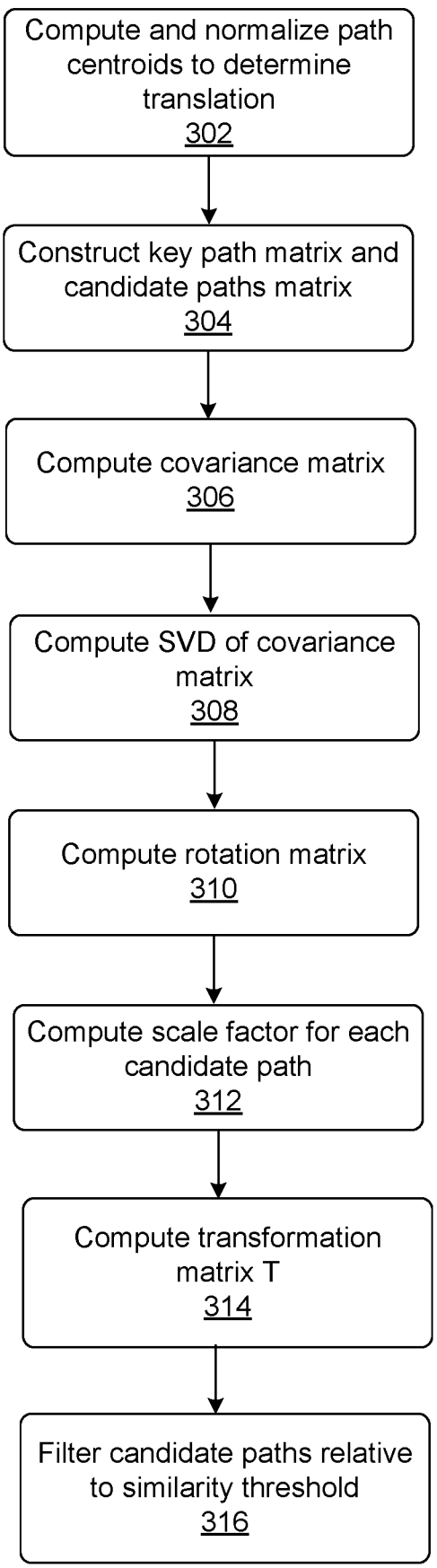
FIG. 3 is a flowchart illustrating more detailed example operations of the system of FIG. 1.

FIG. 3 is a flowchart illustrating more detailed example operations of the system of FIG. 1. In the example of FIG. 3, example implementations are described in which each of the various transformation matrices T are able to encapsulate many geometric transformations such as scaling, rotation and reflection, and other affine transformations. Even for asymmetric/irregular modifications, the described techniques are capable of computing and empirically quantifying an amount of variation between the key path and each candidate path, to thereby utilize the type of similarity threshold referenced above.

As will be apparent from the below description, the described approach(es) provide solutions on a one-to-one basis, as well as on a one-to-many or many-to-many basis. For example, correspondences between a key path and many candidate paths, or between a set of key paths and a set of candidate paths, may be determined using composite matrices P, Q, and T for the key path(s), candidate paths, and corresponding transformation matrices.

Accordingly, the selected, similar paths may be determined together, e.g., in a single application of the composite P, Q, T matrices. Similarly, a desired edit may be specified with respect to a given key path(s), and applied together to all corresponding candidate paths in a single user operation, thereby improving use productivity.

In more detail with respect to FIG. 3, example methods for identifying similar paths given a key path and a set of candidate paths are described in which the key path and candidate paths are represented as cubic Bezier splines, each with N segments. The cubic Bezier splines may be represented as a two column matrix with 3N+1 rows, as shown in Equation 1:

$$\begin{pmatrix} P_{0x}^1 & P_{0y}^1 \\ P_{0x}^2 & P_{0y}^2 \\ \vdots & \vdots \\ P_{0x}^{3N} & P_{0y}^{3N} \\ P_{0x}^{3N+1} & P_{0y}^{3N+1} \end{pmatrix} \quad \text{Equation 1}$$

In Equation 1, the notation P is used, but it will be appreciated from the below that the matrix representation of Equation 1 may be used to represent any key path(s) and/or candidate path(s).

In FIG. 3, using the matrix representation of Equation 1, a center of mass or centroid of each key path and candidate path may be obtained, for use in determining a translation between each key path/candidate path pair (302). In other words, operation 302 of FIG. 3 provides a more specific example of the centroids 128, 130 of FIG. 1, and the associated translation 126 therebetween.

In more detail, each centroid may be calculated by aligning all the points of each Bezier spline around their average, e.g., P0=P0.rowwise( )−P0.columnwise( ).mean( ). As may be appreciated from Equation 1, P0is a (3N+1)×2 matrix for a path P0 with N segments. Normalization of these points around the computed center of mass may be executed to establish scale invariance, e.g., P0/=sqrt(P0.columnwise( ).squaredNorm( ).sum( ))/P0.rows( )).

Further in FIG. 3, a pair of block diagonal matrices may be constructed, with one matrix each for the key path and all corresponding candidate paths to be compared thereto (304), as shown in Equations 2 and 3:

$$P = \begin{pmatrix} P_0 & & & & \\ & P_0 & & & \\ & & \ddots & & \\ & & & P_0 & \\ & & & & P_0 \end{pmatrix} \quad \text{Equation 2}$$

$$Q = \begin{pmatrix} Q_0 & & & & \\ & Q_1 & & & \\ & & \ddots & & \\ & & & Q_{m-2} & \\ & & & & Q_{m-1} \end{pmatrix} \quad \text{Equation 3}$$

In Equation 2, $P_0$ represents the key path tiled diagonally. In Equation 3, $Q_0 \ldots Q_{m-1}$ is the set of candidate paths, and the order of P is the same as the order of Q.

The covariance matrix "H" of P and Q may then be computed (304). For example, the covariance matrix of P and Q may be computed as H=P.transposeInPlace( )*Q. The resulting covariance matrix H is a block diagonal matrix of 2×2 tiles, each representing pair-wise covariance between the key path and each candidate path. The matrix H may be written as in Equation 4.

$$H = \begin{pmatrix} P_0^T Q_0 & & & & \\ & P_0^T Q_1 & & & \\ & & \ddots & & \\ & & & P_0^T Q_{m-2} & \\ & & & & P_0^T Q_{m-1} \end{pmatrix} \quad \text{Equation 4}$$

The singular value decomposition (SVD) of H may be computed (308) using Equation 5 and the known Jacobi eigenvalue algorithm, as in Eigen::JacobiSVD<Eigen::MatrixXd>svd(covariance, Eigen::ComputeFullU|Eigen::ComputeFullV).

$$H = U\Sigma V^T \quad \text{Equation 5}$$

The SVD obtained is also block diagonal, and each block along the diagonal represents the pair wise SVD of the key path and a candidate path.

Further, it can be shown in general for two matrices A and B, where $A=U_A\Sigma_A V_A T$ and $B=U_B\Sigma_B V_B T$ (i.e., SVDs of A and B), then the SVD of A and B written as a block diagonal matrix can be written as in Equation 6. Thus, it may be appreciated that the SVD of H is a block diagonal matrix where each block is the SVD of the pairwise cross-covariance of the key path and each candidate path.

$$\begin{pmatrix} A & 0 \\ 0 & B \end{pmatrix} = \begin{pmatrix} U_A & 0 \\ 0 & U_B \end{pmatrix} \begin{pmatrix} \Sigma_A & 0 \\ 0 & \Sigma_B \end{pmatrix} \begin{pmatrix} V_A^T & 0 \\ 0 & V_B^T \end{pmatrix} = U\Sigma V^T \quad \text{Equation 6}$$

Calculations can then proceed to determine a composite rotation matrix R (310). In other words, as referenced above and described in detail, below, the rotation matrix R represents the optimal rotation between the key path and corresponding candidate path.

To calculate the rotation matrix R, the singular values ($\Sigma$) are discarded, and a block diagonal matrix $D_i$ is calculated such that every block has dimension 2×2, as shown in Equations 7 and 8.

$$d = det\ (VU^T) \quad \text{Equation 7}$$

$$D_i = \begin{pmatrix} 1 & 0 \\ 0 & d \end{pmatrix} \quad \text{Equation 8}$$

Then the composite matrix D computed from $D_i$ can be shown as in Equation 9.

$$D = \begin{pmatrix} D_0 & & & & \\ & D_1 & & & \\ & & \ddots & & \\ & & & D_{m-2} & \\ & & & & D_{m-1} \end{pmatrix} \quad \text{Equation 9}$$

In this way, the composite rotation matrix R may be calculated as $R=UDV^T$, using Eigen::MatrixXd R=svd.matrixU( )*D*svd.matrixV( ).transpose( ).

The scale factor for each candidate path can be computed (312), e.g., in the same way as was done in operation 302 to make $P_0$ scale invariant. In particular, using Eigen::VectorXd sQ=(Q.colwise( ).squaredNorm( ).colwise( ).sum( )Q.rows( )).cwiseSqrt( ).cwiseInverse( ) and Eigen::VectorXd scale=sQ*sqrt(P.colwise( ).squaredNorm( ).sum( )/P.rows( ).

Accordingly, the scale, rotation, and translation components for mapping the key path to every candidate path are available. The final transformation matrix T can be obtained (314), e.g., by concatenating all three. For example, an individual $T_i$ may be written as in Equation 10, in which $S_x$ and $S_y$ are the scale components and $t_x$ and $t_y$ are the translation components.

$$\begin{pmatrix} S_x\cos\theta & \sin\theta & t_x \\ -\sin\theta & S_y\cos\theta & t_y \\ 0 & 0 & 1 \end{pmatrix} \qquad \text{Equation 10}$$

The composite transformation matrix T may thus be written as in Equation 11.

$$T = \begin{pmatrix} T_0 & & & \\ & T_1 & & \\ & & \ddots & \\ & & & T_2 \\ & & & & T_3 \end{pmatrix} \qquad \text{Equation 11}$$

All of the various candidate paths may thus be filtered, relative to a similarity threshold (316). For example, as referenced above, the similarity between paths may be quantified by the error value of Equation 12. That is, lower values of the error, in Equation 12 indicate greater similarity between the given key path/candidate path pair.

$$\text{error}_i = \|\|P_0 T_i - Q_i\| \qquad \text{Equation 12}$$

Based on an emperically determined threshold (e.g., $1e^{-3}$), the subset of similar paths from all candidate paths (error<threshold) may have their corresponding transformation matrices ($T_i$) returned.

Although FIG. 3 provides more specific examples of implementations of the system 100 of FIG. 1, it will be appreciated that many additional or alternative aspects may be included. For example, for handling reflection, the initial matrix representation of the key path P may be augmented by reflecting along the Y axis, and using this reflected path as the key path. Further, the analysis may be extended to 3-dimensional vector images, and other use cases for digital image editing.

As also referenced above, once similar candidate paths have been identified, the similar candidate paths may be highlighted on the digital image within the relevant GUI. It may be possible for the user to de-select identified similar image objects that were identified as being similar, and/or select additional image objects for editing. That is, such additional selection/de-selection operations may occur in the event of an error in the identifying of similar image objects, or may be done simply because of artistic or stylistic choices being made by the user.

In any case, once a set of similar paths Q' and the corresponding transformation matrices T' that specify the mapping from key path to each of these paths are available, the user may proceed to make a single edit to the key path, than can then be propagated to all of the candidate paths determined to be similar and desired to be edited by the user. In particular, when the key path is transformed by a matrix X representing the edits in question, this transformation can be pre-concatenated to the transformation matrix T' to compute the final geometry of the similar paths (i.e., to apply the requested edits). Execution of such simultaneous editing may be executed using Equations 13 and 14.

$$P_{new} = XP_0 \qquad \text{Equation 13}$$

$$Q^i_{new} = T_i XP_0 \qquad \text{Equation 14}$$

As may be appreciated from the above discussion, the techniques described provide highly accurate solutions, with robust, fast, and real time (or near real time) results, even for complex geometries. For example, for paths separated by only affine transformations, example error rates may be on the order of $1e^{-6}$. As may be observed, only a single solve is required, irrespective of the number of candidates paths to examine.

Further, the described approaches support all vector graphic primitives, including text, compound, or group. That is, the technique computes a mapping between two point clouds (ordered sequence of points). Therefore, it is trivial to generalize it for compound objects such as groups or text, e.g., by reducing these to an ordered sequence of points by iterating over the simple path primitives aggregated in these objects.

Figure 4:
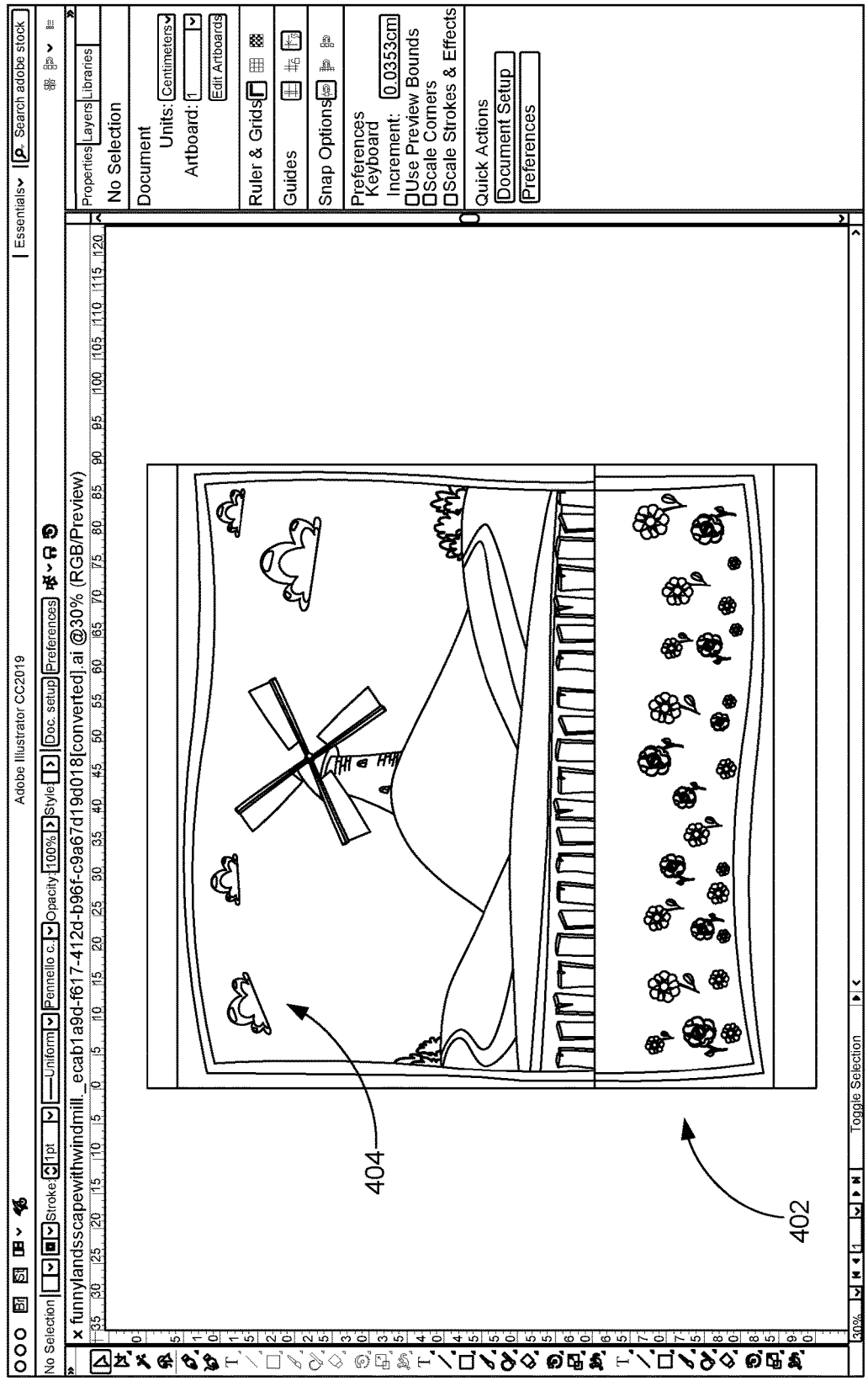
FIG. 4 is a screenshot illustrating an example input vector image and associated user interface of the system of FIG. 1.

FIG. 4 is a screenshot illustrating an example input vector image and associated user interface of the system of FIG. 1. Specifically, in FIG. 4, the illustrated vector image includes a plurality of flowers 402 and clouds 404.

Figure 5:
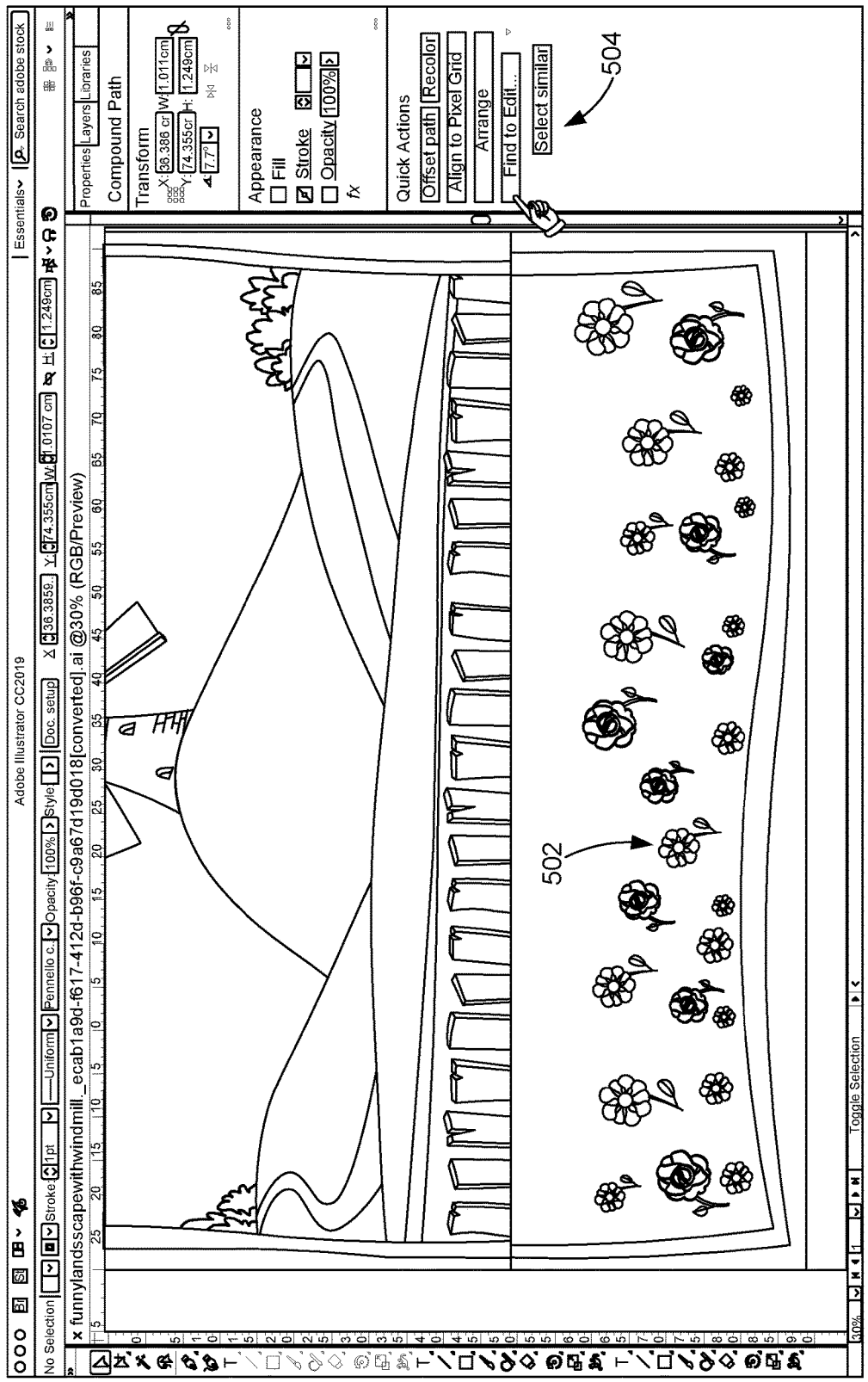
FIG. 5 is a screenshot illustrating a selection function of the user interface of FIG. 4.

FIG. 5 is a screenshot illustrating a selection function of the user interface of FIG. 4. In FIG. 5, a particular flower 502 is selected, such as when a user clicks on the flower 502. More particularly, a button or other GUI element(s) 504 may be included in the GUI for providing a "find to edit . . . select similar" functionality.

Figure 6:
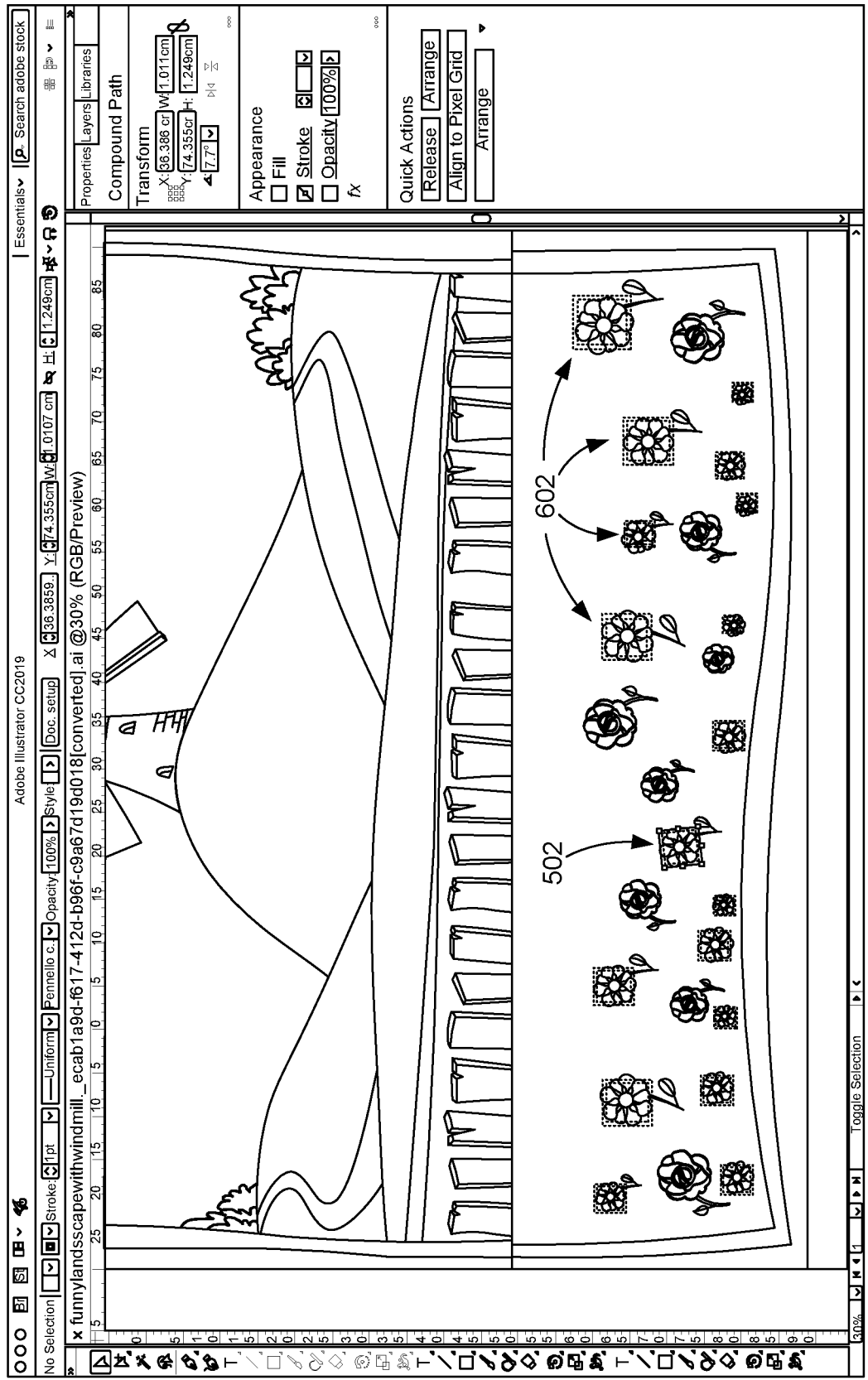
FIG. 6 is a screenshot illustrating a result of the selection operation of FIG. 5.

FIG. 6 is a screenshot illustrating a result of the selection operation of FIG. 5. In FIG. 6, various remaining flowers 602 are highlighted or otherwise visually indicated as being similar to the originally-selected flower 502.

Figure 7:
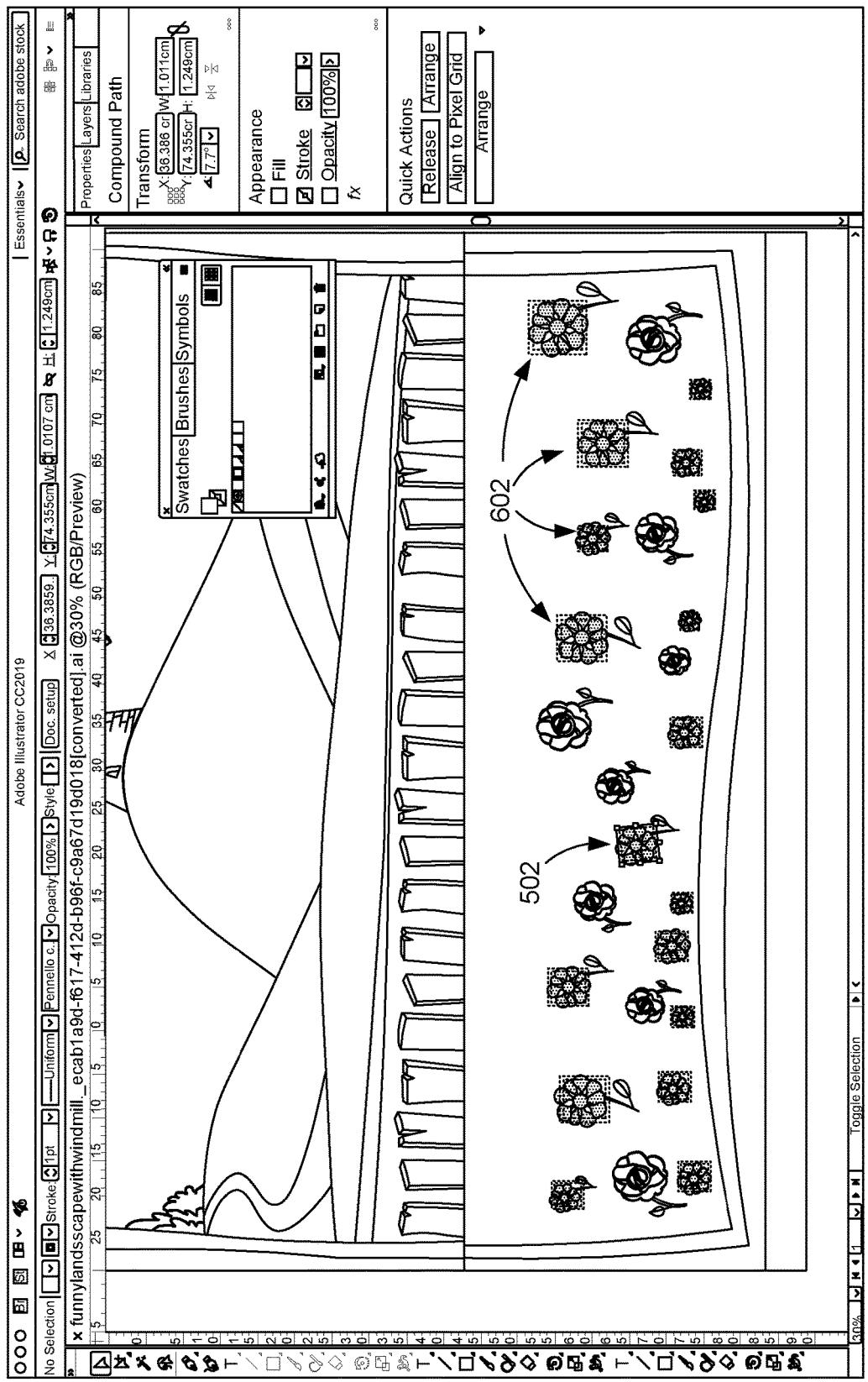
FIG. 7 is a screenshot illustrating an edit operation following the selection operation of FIG. 6.

FIG. 7 is a screenshot illustrating an edit operation following the selection operation of FIG. 6. Specifically, in FIG. 7, the various similar flowers 602 that have been identified are all simultaneously edited. For example, a color change applied to the flower 502 (key path) may be simultaneously applied to all of the identified, similar flowers.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive, via a graphical user interface (GUI), a selection of a key path of a vector image displayed using the GUI, the key path including at least a first vector graphic rendered within the vector image;

identify at least one candidate path of the vector image, the at least one candidate path including at least a second vector graphic rendered within the vector image;

execute a pairwise comparison of the key path with the at least one candidate path, the pairwise comparison including characterization of a translation, scaling, and rotation of the at least one candidate path with respect to the key path within the vector image;

determine, based on the pairwise comparison, that the at least one candidate path is within a similarity threshold defined with respect to the key path; and provide a visual indicator of the at least one candidate path within the GUI, identifying the at least one candidate path as being within the similarity threshold.

2. The computer program product of claim 1, wherein the instructions, when executed to identify the at least one candidate path, are further configured to cause the at least one computing device to:

identify the at least one candidate path including identifying all candidate paths within the vector image.

3. The computer program product of claim 1, wherein the at least one candidate path includes a plurality of candidate paths, and wherein the instructions, when executed to execute the pairwise comparison, are further configured to cause the at least one computing device to:

execute the pairwise comparison including comparing the key path with each of the plurality of candidate paths in parallel.

4. The computer program product of claim 1, wherein the instructions, when executed to execute the pairwise comparison, are further configured to cause the at least one computing device to:

determine the characterization including the translation based on a centroid of the key path and a centroid of the at least one candidate path.

5. The computer program product of claim 1, wherein the instructions, when executed to execute the pairwise comparison, are further configured to cause the at least one computing device to:

determine the characterization including the scaling based on a centroid of the key path, a centroid of the at least one candidate path, and a scale factor.

6. The computer program product of claim 1, wherein the instructions, when executed to execute the pairwise comparison, are further configured to cause the at least one computing device to:

represent the key path as a matrix $P_0$;

construct a diagonal key path matrix P with the diagonal formed using multiple instances of $P_0$ tiled diagonally;

represent a plurality of candidate paths, including the at least one candidate path, as a plurality of matrices $Q_0 \ldots Q_{m-1}$ tiled diagonally within a candidate path matrix Q that is the same order as P; and determine the characterization including the rotation based on a covariance of P and Q.

7. The computer program product of claim 1, wherein the instructions, when executed to execute the pairwise comparison, are further configured to cause the at least one computing device to:

determine a transformation matrix $T_i$ specifying translation components for the translation, scale components for the scaling, and rotation angle for the rotation.

8. The computer program product of claim 7, wherein the at least one candidate path includes a plurality of candidate paths, and the instructions, when executed to execute the pairwise comparison, are further configured to cause the at least one computing device to:

determine a composite transformation matrix T in which individual transformation matrices $T_i$ are tiled diagonally for each key path/candidate path pair.

9. The computer program product of claim 8, wherein the instructions, when executed to determine that the at least one candidate path is within a similarity threshold, are further configured to cause the at least one computing device to:

compute a difference between each candidate path and a product of the key path and the transformation matrix $T_i$ of the corresponding candidate path; and compare the difference to the similarity threshold.

10. The computer program product of claim 1, wherein the instructions, when executed, are further configured to cause the at least one computing device to:

receive an edit request with respect to the key path;

apply the edit request to the key path; and apply the edit request to the at least one candidate path, using the characterization of the translation, scaling, and rotation therebetween.

11. The computer program product of claim 10, wherein the at least one candidate path includes a plurality of candidate paths, and wherein the instructions, when executed, are further configured to cause the at least one computing device to:

apply the edit request to all of the plurality of candidate paths.

12. A computer-implemented method, the method comprising:

receiving, via a graphical user interface (GUI), a selection of a key path of a vector image displayed using the GUI, the key path including at least a first vector graphic rendered within the vector image;

identifying at least one candidate path of the vector image, the at least one candidate path including at least a second vector graphic rendered within the vector image;

executing a pairwise comparison of the key path with the at least one candidate path, the pairwise comparison including characterization of a translation, scaling, and rotation of the at least one candidate path with respect to the key path within the vector image;

determining, based on the pairwise comparison, that the at least one candidate path is within a similarity threshold defined with respect to the key path; and providing a visual indicator of the at least one candidate path within the GUI, identifying the at least one candidate path as being within the similarity threshold.

13. The method of claim 12, wherein identifying the at least one candidate path further comprises:

identifying all candidate paths within the vector image.

14. The method of claim 12, wherein the at least one candidate path includes a plurality of candidate paths, and wherein executing the pairwise comparison comprises:

comparing the key path with each of the plurality of candidate paths in parallel.

15. The method of claim 12, wherein executing the pairwise comparison comprises:

determining a transformation matrix $T_i$ specifying translation components for the translation, scale components for the scaling, and rotation angle for the rotation.

16. The method of claim 15, wherein the at least one candidate path includes a plurality of candidate paths, and wherein executing the pairwise comparison comprises:

determining a composite transformation matrix T in which individual transformation matrices $T_i$ are tiled diagonally for each key path/candidate path pair.

17. The method of claim 16, wherein determining that the at least one candidate path is within a similarity threshold comprises:

computing a difference between each candidate path and a product of the key path and the transformation matrix $T_i$ of the corresponding candidate path; and comparing the difference to the similarity threshold.

18. The method of claim 12, further comprising:

receiving an edit request with respect to the key path;

applying the edit request to the key path; and applying the edit request to the at least one candidate path, using the characterization of the translation, scaling, and rotation therebetween.

19. A computer program product, the computer program product being tangibly embodied on a non-transitory computer-readable storage medium and comprising instructions that, when executed by at least one computing device, are configured to cause the at least one computing device to:

receive, via a graphical user interface (GUI), a selection of a key path of a vector image displayed using the GUI, the key path including at least a first vector graphic rendered within the vector image;

identify a plurality of candidate paths of the vector image, each candidate path of the plurality of candidate paths including at least a second vector graphic rendered within the vector image;

execute pairwise comparisons of the key path with each candidate path of the plurality of candidate paths;

determine, based on the pairwise comparisons, transformation relationships between the key path and each candidate path of the plurality of candidate paths within the vector image; and filter the plurality of candidate paths, relative to a similarity threshold defined using the transformation relationships, to obtain at least one similar candidate path from the plurality of candidate paths.

20. The computer program product of claim 19, wherein the instructions, when executed to determine the transformation relationships, are further configured to cause the at least one computing device to:

determine a transformation matrix $T_i$ for each key path/candidate path pair, specifying translation components, scale components, and rotation angle for the rotation for that pair; and determine a composite transformation matrix T in which individual transformation matrices $T_i$ are tiled diagonally for each corresponding key path/candidate path pair.

* * * * *